United States Patent [19]

Allen

[11] 4,099,568
[45] Jul. 11, 1978

[54] METHOD FOR RECOVERING VISCOUS PETROLEUM

[75] Inventor: Joseph C. Allen, Bellaire, Tex.

[73] Assignee: Texaco Inc., New York, N.Y.

[21] Appl. No.: 753,659

[22] Filed: Dec. 22, 1976

Related U.S. Application Data

[63] Continuation-in-part of Ser. No. 442,944, Feb. 15, 1974, abandoned.

[51] Int. Cl.² .............................................. E21B 43/24
[52] U.S. Cl. ..................................... 166/269; 166/272
[58] Field of Search ........................ 166/269, 272, 303

[56] References Cited

U.S. PATENT DOCUMENTS

| | | | |
|---|---|---|---|
| 3,042,114 | 7/1962 | Willman | 166/272 |
| 3,129,757 | 4/1964 | Sharp | 166/272 X |
| 3,358,759 | 12/1967 | Parker | 166/272 X |
| 3,360,044 | 12/1967 | Lange | 166/272 |
| 3,405,761 | 10/1968 | Parker | 166/272 X |
| 3,782,470 | 1/1974 | West et al. | 166/303 |
| 3,903,967 | 9/1975 | Woodward | 166/269 |
| 3,908,762 | 9/1975 | Redford | 166/272 X |

*Primary Examiner*—Stephen J. Novosad
*Assistant Examiner*—George A. Suchfield
*Attorney, Agent, or Firm*—Carl G. Ries; Thomas H. Whaley; Jack H. Park

[57] ABSTRACT

Steam flooding is frequently unsuccessful in viscous petroleum-containing formations such as tar sand deposits due to loss of steam transmissibility caused by the steam condensing deep in the formation and also caused by heated viscous petroleum forming an oil bank and losing heat and becoming more viscous as it moves through the formation, eventually becoming essentially immobile and blocking further flow through the formation. By injecting a non-condensible, non-oxidizing gas ahead of and/or in combination with steam, this tendency to block or plug the flow channels is reduced or eliminated. Steam and non-condensible, non-oxidizing gas are injected into the formation at a pressure in pounds per square inch not exceeding numerically the overburden thickness in feet in order to avoid fracturing the overburden. Steam and non-condensible, non-oxidizing gas may be mixed prior to injection or injected sequentially or simultaneously to mix in the formation. If steam and non-condensable, non-oxidizing gas are injected separately and simultaneously or sequentially, it is preferred that the gas be injected at a point below where the steam is injected. Steam and gas should be injected so substantially all of the formation to be contacted by injected fluid is contacted by a mixture of steam and the non-condensible, non-oxidizing gas. Suitable non-condensible, non-oxidizing gases include nitrogen, carbon dioxide, flue gas, exhaust gas, natural gas, liquefied petroleum gas, methane, ethane, propane, butane, pentane, hydrogen, and mixtures thereof. Saturated or supersaturated steam may be used.

15 Claims, No Drawings

METHOD FOR RECOVERING VISCOUS PETROLEUM

CROSS REFERENCE TO RELATED APPLICATIONS

This is a continuation-in-part of copending application Ser. No. 442,944, filed Feb. 15, 1974, now abandoned, for a Method for Recovering Viscous Petroleum.

BACKGROUND OF THE INVENTION

1. Field of the Invention

This invention pertains to a method for recovering petroleum from viscous, petroleum-containing formations including tar sand deposits, and more particularly to a method for recovering viscous petroleum from viscous petroleum containing formations by steam flooding. Still more particularly, this application pertains to a method for preventing loss of steam transmissibility during steam flooding operations.

2. Description of the Prior Art

There are many subterranean, petroleum-containing formations throughout the world from which petroleum cannot be recovered by conventional means because of the high viscosity of the petroleum contained therein. The best known and most extreme example of viscous petroleum-containing formations are the tar sands or bituminous sand deposits. The largest and most famous tar sand deposit is in the Athabasca area in the northeastern part of the Province of Alberta, Canada, which deposit contains in excess of 700 billion barrels of petroleum. Other extensive tar sand deposits exist in the western United States and in Venezuela, and lesser deposits are located in Europe and Asia.

Tar sands are defined as sand saturated with a highly viscous crude petroleum material not recoverable in its natural state through a well by ordinary production methods. The petroleum or hydrocarbon materials contained in tar sand deposits are highly bituminous in character, with viscosities ranging in the millions of centipoise at formation temperature and pressure. The tar sand deposits are about 35 percent by volume or 83 percent by weight sand, and the sand is generally a fine grain quartz material. The sand grains are coated with a layer of water, and the void space between the water coated sand grains is filled with bituminous petroleum. Some tar sand deposits have a small gas saturation, generally air or methane, although most tar sand depoits contain essentially no gas. The sum of bitumen and water concentrations consistently equals about 17 percent by weight, with the bitumen portion thereof varying from about two percent to about 16 percent. One of the striking differences between tar sand deposits and more conventional petroleum reservoirs is the absence of a consolidated matrix. While the sand grains are in grain-to-grain contact, they are not cemented together.

Recovery methods for tar sand deposits are classifiable as strip mining or in situ processes. Most of the recovery to date has been by means of strip mining, although strip mining is economically feasible at the present time only in shallow deposits, usually defined as those wherein the ratio of overburden thickness to tar sand deposit thickness is around one or less. In situ processes which have been proposed in the prior art include thermal methods such as fire flooding and steam injection, as well as steam-emulsification drive processes.

Several serious problems are frequently encountered when thermal recovery processes involving steam injection are applied to viscous petroleum containing formations. One of the most critical problems is associated with losing fluid transmissibility. When saturated or supersaturated steam is injected into a petroleum containing formation which does not contain appreciable gas saturation it is difficult to maintain adequate fluid flow between the injection well and the production well. Even though sufficient gas permeability exist initially to permit steam injection into the formation, the transmissibility declines sharply with time for several reasons. Condensation of steam after it has traveled some distance into the formation is one major cause for loss of transmissibility due to the fact that the viscosity of the steam condensate is substantially greater than the viscosity of steam vapor. Also, viscous petroleum heated by the injected steam will experience a substantial viscosity reduction, but as the heated petroleum moves away from the vicinity of the injection well it loses heat to the cooler formation, and consequently the viscosity increases rapidly. Eventually the petroleum viscosity will have increased to the point where it becomes immobile and blocks flow of any additional fluids through the formation. This is an especially troublesome characteristic of the tar sand deposits. Once a plug or blockage by cooled, viscous petroleum occurs, the heated fluids, e.g. steam, cannot be brought into contact with the cooled, immobile petroleum, so the block cannot be corrected by continued steam injection.

Another serious problem encountered in the course of steam injection into viscous petroleum formations is rapid pressure decline after termination of steam injection due to cooling and condensation of the steam in the formation. Since fluid injection pressure is the principal energy source causing petroleum movement in steam flooding processes, loss of pressure will cause rapid production rate decline even through the petroleum is still sufficiently high and its viscosity sufficiently low that production could be maintained. Maintenance of steam injection beyond an optimum point in order to avoid pressure loss is expensive and wasteful of fuel used to generate steam.

Still another problem encountered in relatively thick viscous petroleum-containing formations is vertical stratification of steam injected into the formation, which is generally caused by the density difference between steam vapor and petroleum.

In view of the foregoing, it can be seen that there is a substantial, unfulfilled need for a method for conducting in situ separation and recovery of bitumen by steam flooding so as to avoid plugging of the formation or serious loss of transmissibility and/or premature pressure decline.

SUMMARY OF THE INVENTION

I have discovered, and this constitutes my invention, that viscous petroleum may be recovered from a viscous petroleum-containing formation such as a tar sand deposit according to the process described below. My process requires that there be at least moderate initial gas permeability. My process utilizes preliminary noncondensible, non-oxidizing gas injection followed by injection of steam and non-oxidizing, non-condensible gas as a mixture or in a manner which ensures that steam and gas will mix in the formations. The steam may be supersaturated or saturated. Gases suitable for use in my invention include carbon dioxide, methane, ethane, propane, butane, nitrogen, hydrogen and mixtures thereof.

After non-condensible, non-oxidizing gas has been injected into the formation to establish an initial gas saturation, steam and the non-condensible gas are injected and they may be mixed prior to injection or injected sequentially or separately to mix in the formation. If gas is injected separately from the steam it is preferred that it be injected at a point lower in the formation than the point where steam is injected to ensure maximum mixing. It is important that gas and steam injection be carried out in a manner calculated to ensure that substantially all of the viscous petroleum contacted by steam is also contacted by the non-condensable, non-oxidizing gas. In tar sand deposits injection pressure of the steam-non-condensible gas mixture should not exceed a value in pounds per square inch numerically equal to the overburden thickness in feet in order to avoid fracturing the overburden.

DESCRIPTION OF THE PREFERRED EMBODIMENTS

I. The Process

My invention involves injecting steam and a non-condensible, non-oxidizing gas into a viscous petroleum-containing formation in such a manner that the non-condensable gas is present simultaneously with the steam in the formation. Steam and the non-condensible, non-oxidizing gas may be mixed prior to being introduced into the formation or the gas and stream may be injected sequentially or simultaneously to mix in the formation. A dually completed injection well is useful for simultaneous injection and is especially desirable for formations having substantial vertical thickness since I have found that the mixing of steam and gas is improved by injecting steam into the upper part of the formation and the non-condensible, non-oxidizing gas into the lower portion of the formation.

The most important controllable parameters should be aimed at achieving complete mixing of gas with substantially all of the steam injected into the formation. If gas were injected into an upper permeable strata and steam were injected into a lower permeability oil saturated interval below, only nominal mixing of steam and gas would occur, and that only at the interface between the upper high permeability zone and the lower, low permeability oil containing interval. The problem of loss of transmissibility in most of the oil containing interval would still be present, and the fact that gas was present in the upper zone would not cure or prevent the problem of steam transmissibility loss to which the present process is directed. If gas pressurization of a high permeability, low oil saturation zone overlying an oil saturated interval is desired to prevent loss of steam into the upper interval, it may be accomplished simultaneously with my process so long as gas and steam are injected into the lower, oil containing interval. It is essential that gas be present in substantially all portions of the oil-containing interval that are invaded by steam, to prevent loss of steam transmissibility.

In application of the process of my invention in a formation wherein the injection well is completed with two separate flow paths, such as a tubing and annular space, the first step will involve injecting the non-condensible gas into the well, preferably through both communication paths initially for a period of time sufficient to sweep the formation for some distance away from the injection well, in order to establish a gas saturation in the formation prior to contacting the formation with steam. Although it is not always necessarily essential that gas be injected before steam injection is begun, it is the preferred embodiment of the process of my invention. In application of the process of my invention to tar sand deposits, the preliminary non-condensible gas sweep is especially desirable. Although good results can be realized by using a preliminary non-condensible gas sweep involving injection into only the upper or lower portions of the formation, superior results are obtained if non-condensible gas is injected into both upper and lower portions of the formation prior to steam injection.

Gas injection into the formation according to the above procedure is continued for sufficient time to insure contact with at least ten percent of the pore space which will ultimately be swept by the injected recovery fluid. Ideally non-condensible gas injection is continued at least until production thereof is obtained at the production well.

Once the desired preliminary non-condensible gas sweep has been completed, steam injection should be initiated. Ideally, the gas sweep should be followed by simultaneous injection of non-condensible, non-oxidizing gas and steam. Ordinarily the same non-condensible, non-oxidizing gas will be used in the combined gas-steam injection phase as was used in the preliminary gas sweep phase, although a different gas may be used if desirable or necessitated by costs or other logistics considerations.

The simultaneous injection of steam and non-condensible, non-oxidizing gas may be accomplished in a well employing tubing and annular space between the tubing and casing as separate injection paths by connecting the output of a steam generator to the communication path in fluid communication with the upper portion of the formation and connecting the output of a gas compressor on the surface with the injection path in fluid communication with the lower portion of the formation.

The ratio of non-condensible, non-oxidizing gas flow rate to steam flow rate can vary from about 0.1 to about 10 standard cubic feet of gas per pound of steam and the preferred range is from about 1 to about 3 SCF of gas per pound of steam. The ratio may be varied with time, and one preferred embodiment involves tapering or continually varying the ratio from essentially pure non-condensible, non-oxidizing gas to the desired final ratio. This is a particularly desirable embodiment for use in low transmissibility tar sand deposits.

Care should be taken to maintain the injection pressure below a value which would cause fracturing of the overburden. Generally, the injection pressure in pounds per square inch should be numerically equal to or less than the overburden thickness expressed in feet.

Several advantages result from non-condensible, non-oxidizing gas injection simultaneously with steam injection above those attainable with steam injection alone. The presence of non-condensible gas in formation flow channels will prevent decline of well-to-well transmissibility due to steam condensate filling the flow channels. Moreover, the gas also prevents total loss of transmissibility or occurrence of plugging as a result of petroleum cooling and becoming so viscous as to be immobile. Also, rapid pressure decline after cessation of steam injection as a result of steam condensation is avoided. These results can only be attained, however, if gas and steam are present simultaneously throughout the entire portion of the formation to be contacted by steam, to prevent isolated occurrences of blockage in the formation. The degree of improvement in recovery efficiency will be described more fully later in the experimental section.

After an amount of thermal energy in the form of steam has been supplied to the formation sufficient to provide the desired petroleum viscosity reduction, a less expensive fluid such as water or non-condensible gas may be injected to scavenge heat from the formation rock and displace heated petroleum toward the production well. This provides maximum utilization of the thermal energy supplied to the formation for viscosity reduction, and improves the economics of the process.

Either saturated or supersaturated steam may be used successfully in the process described herein.

II. The Non-Condensible, Non-Oxidative Gas

Any non-oxidizing material, substantially all of which will remain gaseous at the temperature and pressure existing in the formation may be used as the non-condensible, non-oxidizing gas for the preliminary gas sweep and for the simultaneous gas-steam injection phase of the process of my invention. For example, nitrogen is a very suitable material for use in my process. Carbon dioxide is also a preferred gas, although it must be remembered that carbon dioxide is quite soluble in petroleum. Solubility of the gas is an advantage since dissolution of gas in petroleum will reduce the viscosity of the petroleum; however, this solubility must be taken into account to the extent that more than the amount of gas which will be dissolved by the petroleum must be injected so some of the gas will remain in the gaseous, undissolved phase in the formation. Carbon dioxide is frequently available as by-products of refinery or chemical processes or from subterranean formations.

Exhaust gas or flue gas may also be used as the non-condensible, non-oxidative gas for use in my process. Such waste gases are usually predominantly nitrogen and carbon dioxide. Some treatment of exhaust or flue gas may be needed to remove acid-forming constituents so as to reduce corrosion of metals used in tubing and other equipment. One preferred embodiment comprises using the flue gas from the steam generator as at least a portion of the non-condensible gas used in my process.

Low molecular weight hydrocarbons may also be used in the process of my invention. Any paraffinic or olefinic hydrocarbon, either linear or branched, whose vapor pressure is greater than the vapor pressure of water at the temperature and pressure of the steam being injected, may be used. For example, methane, ethane, propane and butane, as well as ethylene, propylene, butylene, etc. and mixtures thereof, may be used for the preliminary gas sweep and/or as the non-condensible, non-oxidizing gas injected with steam.

Hydrogen may also be used as the non-condensible, non-oxidizing gas in this process.

Mixtures of any two or more of the above described gaseous materials may also be used in my process.

III. Field Example

My invention may better be understood by reference to the following pilot field example, which is offered only as an illustrative embodiment of my invention, and is not intended to be limitative or restrictive thereof.

A tar sand deposit is covered with 300 feet of overburden and it is determined that the thickness of the tar sand deposit is 75 feet. An injection and a production well are drilled, 100 feet apart, and the production well is completed in the full interval of the tar sand deposit. The injection well is similarly completed over the full interval. Facilities for mixing steam and gas on the surface are provided. Spinner surveys indicate that there are no intervals of high permeability within this particular segment of the tar sand deposit, and the overall gas permeability of the entire formation is moderately high.

Natural gas, which is predominantly methane, is injected in the formation via the injection well at a pressure of 200 pounds per square inch. After production of gas from the production well is observed, a mixture of 80 percent quality steam and the flue gas from the steam generator is injected into the formation. The volume ratio of nitrogen to steam is initially 3 standard cubic feet per pound, with the ratio decreasing gradually to about 0.1 SCF/pound over a 6 day period.

Injection of the flue gas and steam continues for approximately 1 week, before oil production is achieved. Steam and flue gas are injected continually for 5 months, after which air is injected for 1 month to sustain pressure in the formation. Water injection is then initiated to scavenge heat from the formation rock and provide the displacement energy for continued production. After the water-oil ratio rises to 40 the operation is terminated.

IV. Experimental

In order to establish the operability of the process of my invention, and further to determine the optimum materials and procedures, the following laboratory work was performed. A laboratory cell was utilized in these experiments in order to simulate underground tar sand deposits. The model is a pipe, 15 inches long and 18 inches in diameter. One inch diameter wells, one for injection and one for production, are included, each being positioned three inches from the cell wall and 180 degrees apart. The top of the well is equipped with a piston and sealing rings which impose overburden pressure on the tar sand.

In each of the following tests the cell described above was packed with a mined tar sand sample and compressed by pneumatic tamping to a density of about 2 gm/cc, followed by application of an overburden pressure of 500 psig for 6 days to compact the tar sand material.

A series of tests were performed using steam and mixtures of steam and several non-condensible, non-oxidizing gases, specifically nitrogen, carbon dioxide, methane, propane and pentane. The following data summary of these runs gives the total percent recovery obtained and maximum percent bitumen in the effluent from the cell for each run.

TABLE I

| Run | Injected Fluids | % Recovery | % Bitumen in Effluent |
|---|---|---|---|
| A | Steam | 22 | 11 |
| B | Steam + Nitrogen | 38 | 18 |
| C | Steam + Carbon Dioxide | 31 | 19 |
| D | + Methane | 39 | 21 |
| E | Steam + Propane | 65 | 25 |

It can be seen from the foregoing laboratory data better in all of the runs wherein a non-condensable, non-oxidizing gas was mixed with steam than when steam alone was used. Moreover, the process efficiency is improved by including the non-condensable, non-oxidizing gas with steam as evidenced by the fact that the % bitumen in the effluent is also greater for all runs using a non-condensable, non-oxidizing gas than for steam alone.

While my invention has been described in terms of a number of illustrative embodiments, it should be understood that it is not so limited, since many variations of the process of my invention will be apparent to persons skilled in the related art without departing from the true spirit and scope of my invention. Similarly, while mechanisms have been proposed to explain the benefits resulting from the process of my invention, I do not wish to be restricted to any particular explanation of the mechanisms responsible for the benefits achieved through the use of my process. It is my desire and intention that my invention be limited only such restrictions and limitations as are imposed in the appended claims.

I claim:

1. A method of recovering viscous petroleum including bitumen from a subterranean, viscous petroleum-containing formation including a tar sand deposit, said formation being penetrated by at least one injection well and by at least one production well, said injection well containing at least two separate flow paths, the first being in fluid communication with the upper portion of the petroleum formation and the second being in fluid communication with the lower portion of the formation, comprising:
   (a) injecting steam into the upper portion of the formation via the first flow path; and
   (b) injecting a gas which is non-condensable and non-oxidizing at formation conditions into the lower portion of the petroleum containing formation via the second flow path, said non-condensable gas being selected from the group consisting of nitrogen, methane, ethane, propane, butane, natural gas, liquefied petroleum gas, ethylene, propylene, butylene, hydrogen, and mixtures thereof, said non-condensable gas being injected essentially simultaneously with steam injection so the steam and non-condensable gas mix in the formation and the non-condensable gas contacts substantially all of the viscous petroleum contacted by the steam, thereby preventing loss of steam transmissibility in the formation due to steam condensation or creation of an immobile viscous oil bank in the formation, said steam and gas displacing petroleum toward the production well; and
   (c) recovering petroleum from the formation via the production well.

2. A method as recited in claim 1 comprising the additional step of injecting sufficient non-condensable, non-oxidizing gas into the formation prior to injecting steam thereinto, said gas being injected into both the upper and lower portion of the formation via both flow paths so as to contact at least ten percent of the pore volume of the formation to be contacted by steam.

3. A method as recited in claim 2 wherein non-condensable, non-oxidizing gas injection is continued until production thereof occurs at the production well before steam injection is initiated.

4. A method as recited in claim 1 wherein the pressure expressed in pounds per square inch at which the steam is injected into the formation is not greater numerically than the thickness of the overburden expressed in feet.

5. A method as recited in claim 1 wherein the pressure expressed in pounds per square inch at which the non-condensable, non-oxidizing gas is injected into the formation is not greater numerically than the thickness of the overburden expressed in feet.

6. A method as recited in claim 1 wherein the non-condensable, non-oxidizing gas is nitrogen.

7. A method as recited in claim 1 wherein the non-condensable, non-oxidizing gas is methane.

8. A method as recited in claim 1 wherein the non-condensable, non-oxidizing gas is ethane.

9. A method as recited in claim 1 wherein the non-condensable, non-oxidizing gas is propane.

10. A method as recited in claim 1 wherein the non-condensable, non-oxidizing gas is butane.

11. A method as recited in claim 1 wherein the non-condensable, non-oxidizing gas is hydrogen.

12. A method as recited in claim 1 wherein the ratio of the non-condensable, non-oxidizing gas to the steam is from about 0.10 to about 10 standard cubic feet of gas per pound of steam.

13. A method as recited in claim 1 wherein the ratio of the flow rate of non-condensable, non-oxidizing gas to the flow rate of steam is decreased with time.

14. A method as recited in claim 1 wherein non-condensable, non-oxidizing gas is injected after steam injection is terminated.

15. A method as recited in claim 1 wherein water is injected after termination of steam injection.

* * * * *